United States Patent
Iwamoto

(10) Patent No.: US 10,089,726 B2
(45) Date of Patent: Oct. 2, 2018

(54) IMAGE PROCESSING APPARATUS, IMAGE PROCESSING METHOD, AND STORAGE MEDIUM, RELATING TO GENERATING AN IMAGE CORRESPONDING TO A PREDETERMINED THREE-DIMENSIONAL SHAPE BY TRANSFORMING A CAPTURED IMAGE

(71) Applicant: CANON KABUSHIKI KAISHA, Tokyo (JP)

(72) Inventor: Kazunari Iwamoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 111 days.

(21) Appl. No.: 15/051,462

(22) Filed: Feb. 23, 2016

(65) Prior Publication Data
US 2016/0253780 A1    Sep. 1, 2016

(30) Foreign Application Priority Data
Feb. 26, 2015  (JP) ................................. 2015-037436

(51) Int. Cl.
G06T 15/00    (2011.01)
G06T 5/00     (2006.01)
G06T 3/00     (2006.01)

(52) U.S. Cl.
CPC .............. G06T 5/006 (2013.01); G06T 3/005 (2013.01)

(58) Field of Classification Search
CPC ....... G06T 5/006; G06T 3/005; G06T 3/4038; B60R 2300/607
See application file for complete search history.

(56) References Cited

U.S. PATENT DOCUMENTS

| 2006/0202984 A1* | 9/2006 | Yang ................. G06T 3/4038 345/419 |
| 2009/0167856 A1* | 7/2009 | Chou ...................... B60R 1/00 348/118 |
| 2014/0152774 A1* | 6/2014 | Wakabayashi ......... G08G 1/168 348/46 |

FOREIGN PATENT DOCUMENTS

| JP | 2002-83285 A | 3/2002 |
| JP | 2005-056295 A | 3/2005 |
| JP | 2013-074423 A | 4/2013 |
| JP | 2013-137698 A | 7/2013 |

* cited by examiner

*Primary Examiner* — Brian P Werner
(74) *Attorney, Agent, or Firm* — Canon U.S.A., Inc. IP Division

(57) ABSTRACT

An image processing apparatus includes an acquisition unit configured to acquire information for identifying a position of a plane in a captured image, where the captured image includes a structure composed of a plurality of planes as an object, a determination unit configured to determine a correspondence relationship between a region corresponding to the plane in the captured image and a region in an overhead image to be created, according to the information acquired by the acquisition unit, and a generation unit configured to correct an image of the region corresponding to the plane in the captured image so that the corrected image corresponds to the region in the overhead image to be created, according to the correspondence relationship determined by the determination unit, and generate an overhead image composed of a plurality of corrected images that are combined with each other.

12 Claims, 19 Drawing Sheets

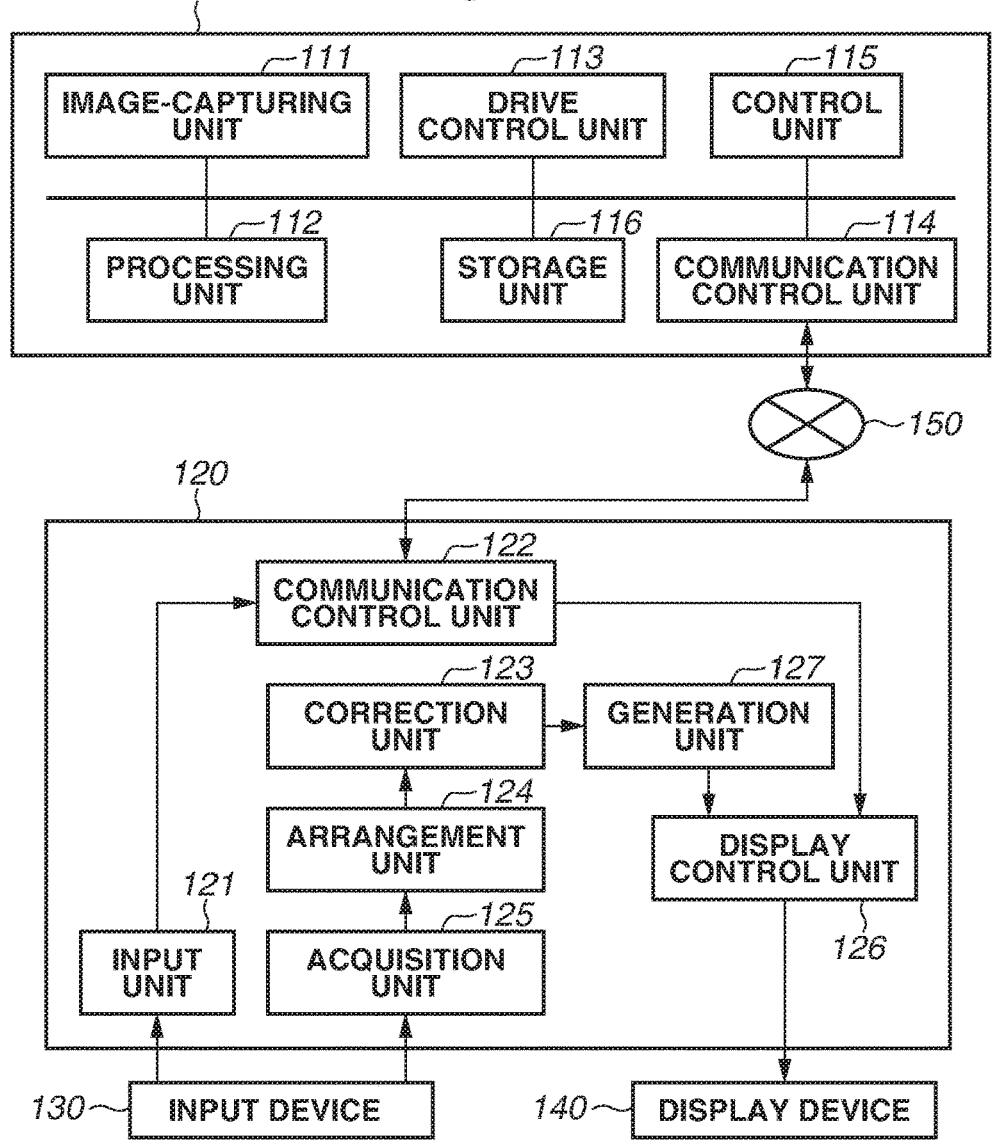
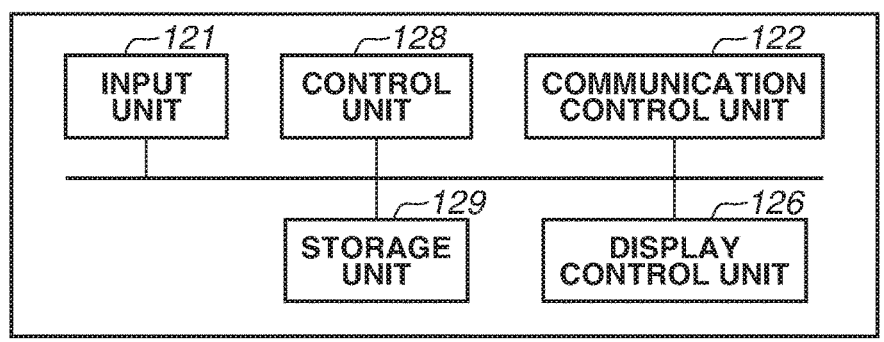

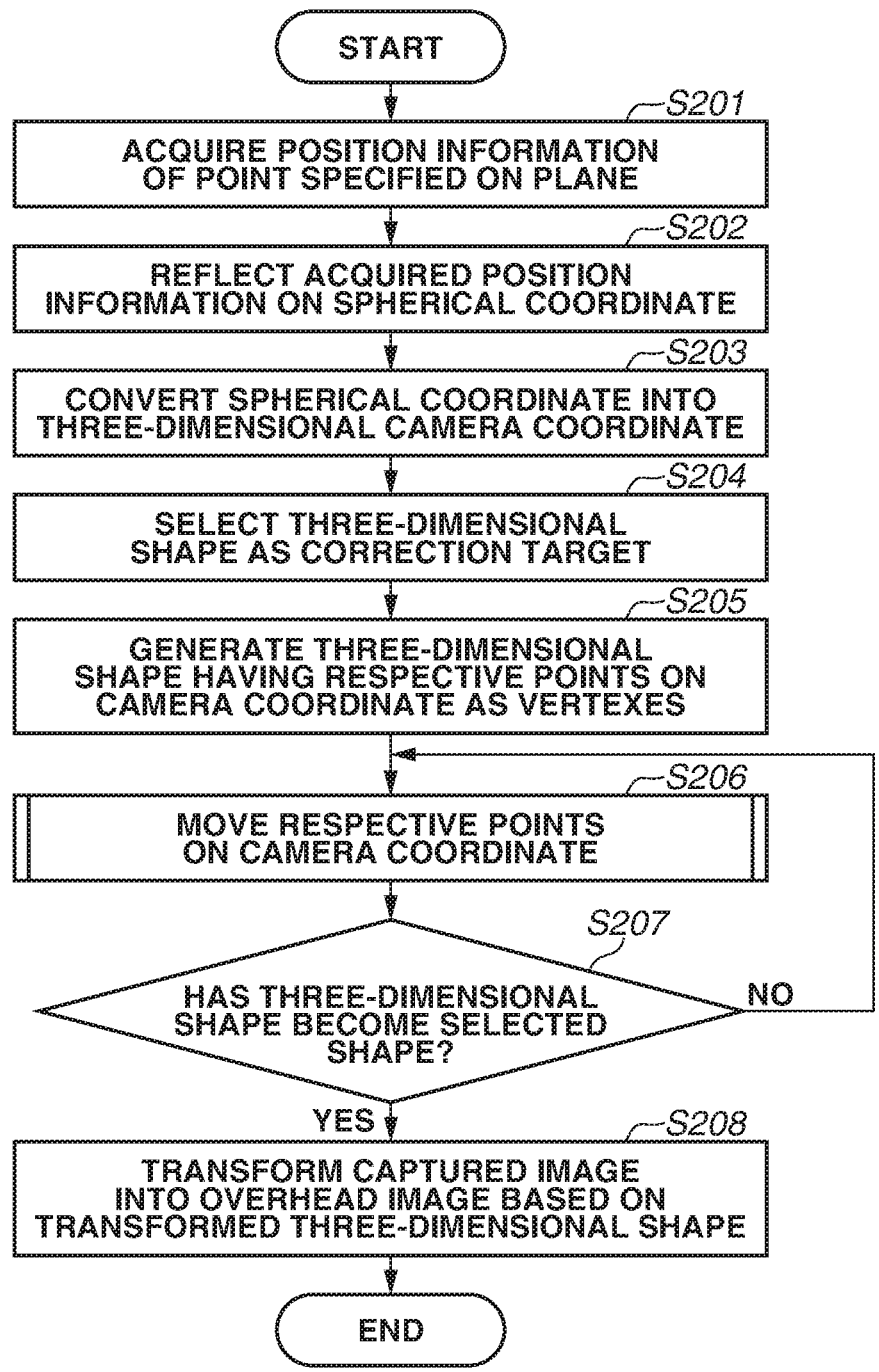

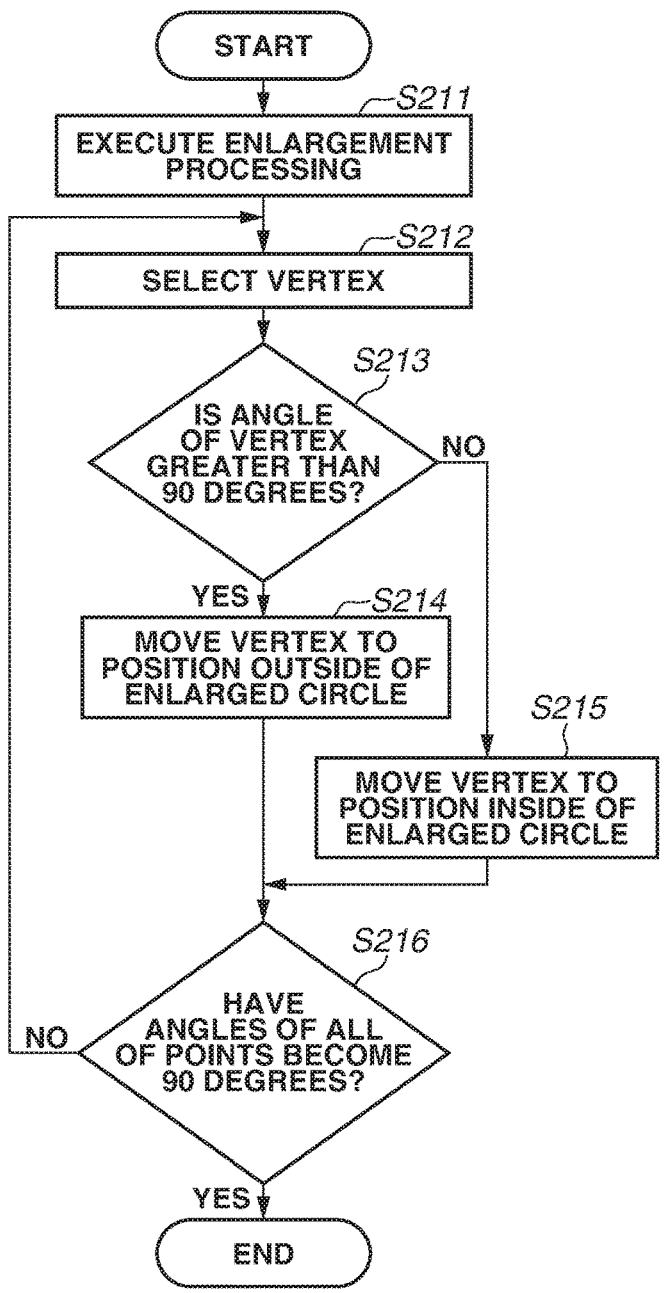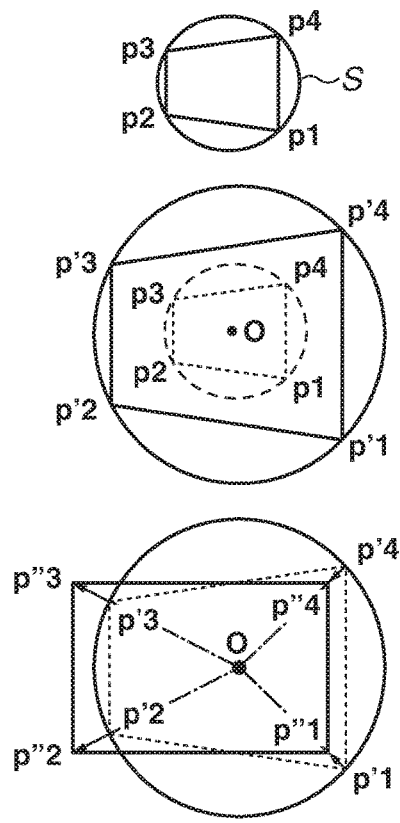

IMAGE PROCESSING APPARATUS, IMAGE PROCESSING METHOD, AND STORAGE MEDIUM, RELATING TO GENERATING AN IMAGE CORRESPONDING TO A PREDETERMINED THREE-DIMENSIONAL SHAPE BY TRANSFORMING A CAPTURED IMAGE

BACKGROUND OF THE INVENTION

Field of the Invention

The present invention relates to an image processing technique for generating an image corresponding to a predetermined three-dimensional shape by transforming an image captured by an image-capturing device.

Description of the Related Art

Conventionally, there has been known a technique for generating an overhead image illustrating a state where an object is seen from a higher and virtual viewpoint that is different from a position of an image-capturing device by transforming an image of a periphery of the object captured by the image-capturing device.

Japanese Patent Application Laid-Open No. 2013-137698 discusses a technique for generating an overhead image illustrating a state where a vehicle is seen from a higher and virtual viewpoint set to a point above the vehicle by transforming an image captured by an in-vehicle image-capturing device that captures an image of the lower portion of the vehicle.

According to the technique discussed in Japanese Patent Application Laid-Open No. 2013-137698, a virtual projection plane having a three-dimensional shape is set, and pixels of an image actually captured by the in-vehicle image-capturing device are projected onto the virtual projection plane, thereby generating an overhead image.

However, in the technique discussed in Japanese Patent Application Laid-Open No. 2013-137698, the image is transformed without distinguishing whether the object captured by the in-vehicle image-capturing device is a road surface or a wall. In other words, in the technique discussed in Japanese Patent Application Laid-Open No. 2013-137698, the image is transformed based on an assumption that all of the objects captured by the in-vehicle image-capturing device are road surfaces. Accordingly, in a case where an image captured by the in-vehicle image-capturing device includes an image of a wall, an image of a road surface is displayed with less deformation when the image is transformed into an overhead image. However, because the same image processing as that executed on the image of the road surface is executed on the image of the wall, the shape of the image of the wall may be deformed after transformation.

According to the present invention, an object in a captured image is expressed in a desired shape in a case where an image corresponding to a three-dimensional shape is generated by transforming an image captured by an image-capturing device.

SUMMARY OF THE INVENTION

The present invention is directed to an image processing apparatus, an image processing method, and a storage medium that are capable of expressing an object in a captured image in a desired shape in a case where an image corresponding to a three-dimensional shape is generated by transforming an image captured by an image-capturing device.

According to an aspect of the present invention, an image processing apparatus includes an acquisition unit configured to acquire information for identifying a position of a plane in a captured image, where the captured image includes a structure composed of a plurality of planes as an object, a determination unit configured to determine a correspondence relationship between a region corresponding to the plane in the captured image and a region in an overhead image to be created, according to the information acquired by the acquisition unit, and a generation unit configured to correct an image of the region corresponding to the plane in the captured image so that the corrected image corresponds to the region in the overhead image to be created, according to the correspondence relationship determined by the determination unit, and generate an overhead image composed of a plurality of corrected images that are combined with each other.

Further features of the present invention will become apparent from the following description of exemplary embodiments with reference to the attached drawings.

BRIEF DESCRIPTION OF THE DRAWINGS

FIGS. 1A and 1B are block diagrams illustrating an image processing system according to an exemplary embodiment of the present invention.

FIGS. 2A, 2B, and 2C are flowcharts and a diagram illustrating a flow of image generation processing.

DESCRIPTION OF THE EMBODIMENTS

Hereinafter, exemplary embodiments of the present invention will be described in detail with reference to the appended drawings. In the exemplary embodiments below, a method for generating an overhead image by transforming a captured image of an interior of a room will be described. An overhead image represents a state of an object captured from a virtual view point that is different from an image-capturing position of an image-capturing device 110. A transformed image is not necessarily an overhead image of an object, but can be an image that represents a state of the object seen from an optional viewpoint.

In a first exemplary embodiment, a method for generating an image that represents a state of a room seen from a ceiling of the room by transforming a captured image of an interior of a rectangular parallelepiped-shaped room will be described. The room is composed of a plurality of planes such as a floor surface and wall surfaces. The room is one example of a structure composed of a plurality of planes.

Figure 3:
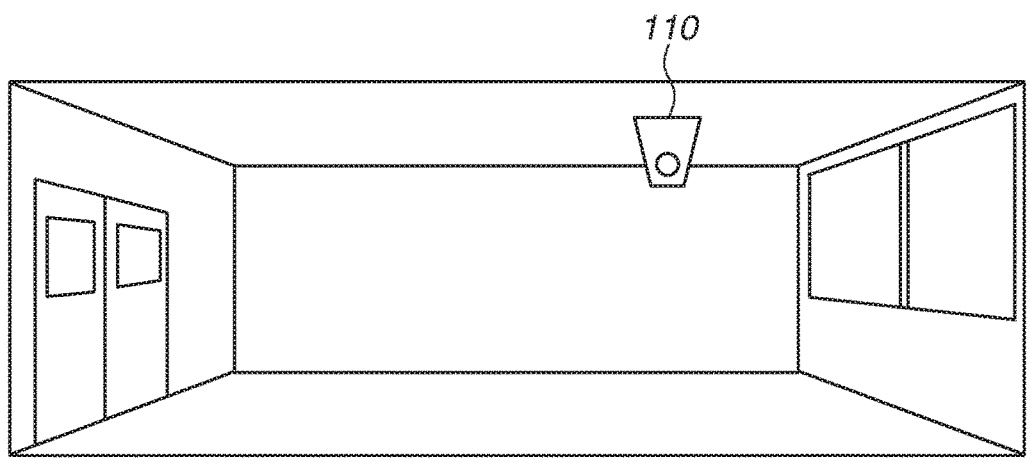
FIG. 3 is a diagram illustrating an example of an object and an installation state of an image-capturing device.
Figure 4:
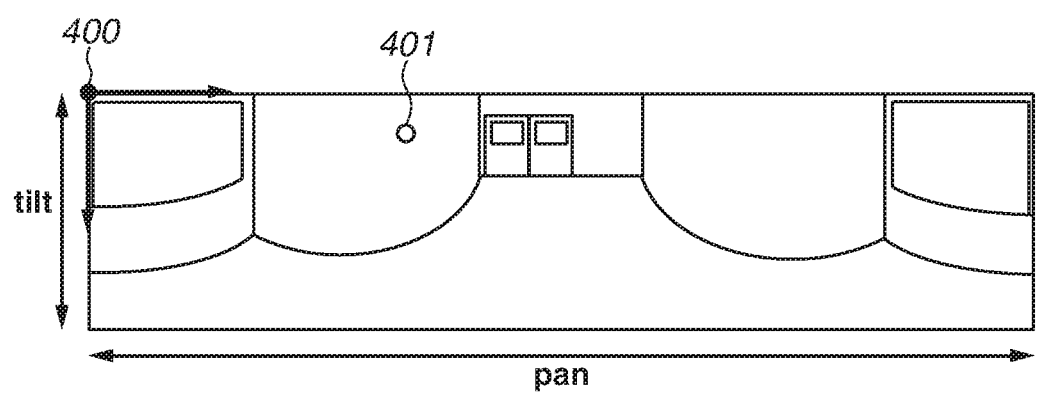
FIG. 4 is a diagram illustrating a panoramic image that represents an image-capturing range of the image-capturing device.

In the present exemplary embodiment, as illustrated in FIG. 3, the image-capturing device 110 is disposed on the ceiling of the room. In the present exemplary embodiment, a method for generating an overhead image illustrated in FIG. 11 by transforming a panoramic image illustrated in FIG. 4 will be described. FIG. 4 is a diagram illustrating a panoramic image that is generated by combining a plurality of images captured by the image-capturing device 110 while changing the image-capturing direction.

According to the present exemplary embodiment, the image-capturing device 110 can perform an operation to change the image-capturing direction in a pan direction and a tilt direction to capture an image having a range of 360 degrees in the pan direction. The image-capturing device 110 does not have to include a driving mechanism that can rotate the image-capturing device 110 by 360 degrees in the pan direction as long as an image having a range of 360 degrees in the pan direction can be captured by driving both of a pan driving mechanism and a tilt driving mechanism. For example, an image having a range of 360 degrees in the pan direction can be captured if the image-capturing device 110 has a movable range of 180 degrees in both of the pan direction and the tilt direction. In such a configuration, an image having a range of 270 degrees in the pan direction cannot be captured by the driving operation of only the pan driving mechanism. However, the image having a range of 270 degrees in the pan direction can be captured when the image-capturing direction is driven by 90 degrees in the pan direction by the pan driving mechanism and then driven by 180 degrees in the tilt direction by the tilt driving mechanism.

In the present exemplary embodiment, images captured by the image-capturing device 110 are combined with each other in order to generate a panoramic image having a range of 360 degrees in the pan direction. Then, information indicating a position of a point in the generated panoramic image specified by a user or a point automatically detected from the panoramic image by the image-capturing device 110 is acquired.

In addition to the above, information indicating a position of a predetermined point in a real space where the image-capturing device 110 is installed may be acquired. An example of the predetermined point is a corner of the room that includes the image-capturing device 110. The point is information for identifying each of planes constituting a structure. In order to identify a plane, information about a line or a region may be acquired instead of information about a point. Further, a map image that represents a peripheral state of the image-capturing device 110 previously stored in the image-capturing device 110 may be used instead of the panoramic image. Alternatively, an image other than the panoramic image that represents the image-capturing range of the image-capturing device 110 may be used.

A configuration of an image processing system according to the present exemplary embodiment will be described with reference to FIG. 1A. The image-capturing device 110 transmits an image captured by an image-capturing unit 111 to a client apparatus 120 via a network 150. In the present exemplary embodiment, the image-capturing device 110 incorporates the image-capturing unit 111. The configuration is not limited thereto. An information processing apparatus that receives a captured image from an external image-capturing device including the image-capturing unit 111 and relays the received captured image to the client apparatus 120 may be employed instead of the image-capturing device 110.

The client apparatus 120 causes a display device 140 to display the captured image received from the image-capturing device 110. Further, according to an instruction input by an input device 130, the client apparatus 120 outputs a control signal for controlling an image-capturing direction and a view angle of the image-capturing unit 111 to the image-capturing device 110 via the network 150. For example, the client apparatus 120 can be a personal computer (PC). Alternatively, a mobile terminal such as a tablet terminal or a smartphone may be employed as the client apparatus 120.

The display device 140 displays an image received from the client apparatus 120. In addition, the display device 140 may be configured as an integral unit of the client apparatus 120.

The input device 130 inputs a signal according to a user operation to the client apparatus 120. For example, a mouse or a keyboard may be employed as the input device 130. The input device 130 may be configured as an integral unit of the client apparatus 120. For example, a signal according to a user operation may be input to an input unit 121 described below via a touch panel of a tablet terminal.

For example, the network 150 may be configured of the Internet, a wired local area network (LAN), a wireless LAN, a wide area network (WAN), or an analog cable. The network 150 is configured of a plurality of routers, switches, and cables, and a communication standard, a scale, and a configuration thereof are not limited. For example, Ethernet (registered trademark) can be employed as the communication standard of the LAN. A plurality of image-capturing devices 110 or a plurality of client apparatuses 120 may be connected to the network 150.

Subsequently, a configuration of the image-capturing device 110 will be described. The image-capturing unit 111 includes an optical system configured of a lens unit, and an image sensor. The image-capturing unit 111 captures an image on the image sensor by making an intersection point of an optical axis of the optical system and the image sensor as an imaging center. A complementary metal-oxide semiconductor (CMOS) sensor or a charged coupled device (CCD) sensor may be used as the image sensor. The image sensor converts an object image formed by the optical system into an image signal. According to an instruction from a drive control unit 113 described below, the image-capturing unit 111 operates the lens unit to change a focal distance (i.e., zoom magnification), thereby changing a view angle of a camera. In the present exemplary embodiment, "view angle" refers to an image-capturing range of the image-capturing device 110 when the image-capturing unit 111 captures an image in an optional image-capturing direction. For example, a view angle according to the present exemplary embodiment corresponds to a vertical length and a horizontal length of the image when the image-capturing unit 111 outputs a rectangular-shaped captured image. Alternatively, in a case where an aspect ratio of the vertical and the horizontal lengths are already determined, the view angle can be identified based on a length of the diagonal line of the captured image even if both of the vertical and the horizontal lengths of the rectangular-shaped captured image are not acquired.

A processing unit 112 processes a signal of the image captured by the image-capturing unit 111. The processing unit 112 executes coding of the image captured by the image-capturing unit 111. For example, Joint Photographic Experts Group (JPEG) can be employed as a coding method. Further, Moving Picture Experts Group Phase (MPEG-4) Advanced Visual Communication (AVC) H.264 (hereinafter, "H.264") can be employed as a coding method. Alternatively, High Efficiency Video Coding (HEVC) can be employed as a coding method. However, the coding method is not limited to the above methods. Furthermore, the processing unit 112 may select a coding method from a plurality of coding methods and execute coding.

The drive control unit 113 performs control to change the image-capturing direction and the view angle of the image-capturing unit 111. In the present exemplary embodiment, the drive control unit 113 can change the image-capturing direction of the image-capturing unit 111 in the pan direction and the tilt direction while changing the view angle (zoom). The configuration thereof is not limited to the above. It is possible to achieve the effect of the present invention even if the image-capturing unit 111 does not have a function for changing the view angle.

The communication control unit 114 executes control processing for transmitting the captured image processed by the processing unit 112 to the client apparatus 120. Further, the communication control unit 114 receives a control instruction from the client apparatus 120 to the image-capturing device 110.

The control unit 115 controls operations of respective units of the image-capturing device 110. In the present exemplary embodiment, the control unit 115 analyzes an instruction received from the client apparatus 120 to control the operations of the respective units of the image-capturing device 110. For example, a central processing unit (CPU) can be used as the control unit 115. In a case where the control unit 115 is configured as a processor, for example, the control unit 115 controls the respective units of the image-capturing device 110 by executing a program stored in a storage unit 116 described below.

The storage unit 116 stores various setting values and data of the image-capturing device 110. In a case where the control unit 115 is configured of a processor, the storage unit 116 stores a program to be executed by the control unit 115. For example, a memory such as a random access memory (RAM) or a read only memory (ROM) can be used as the storage unit 116. Alternatively, a storage medium such as a hard disk drive (HDD) may be used as the storage unit 116. Furthermore, a removable media such as a flash memory or a memory card may be used as the storage unit 116.

Next, a configuration of the client apparatus 120 will be described. The input unit 121 receives a signal for controlling the image-capturing device 110 from the input device 130 and inputs the received signal to the client apparatus 120. A communication control unit 122 transmits a user input received by the input unit 121 to the image-capturing device 110. Further, the communication control unit 122 receives a captured image from the image-capturing device 110. A display control unit 126 outputs the captured image received by the communication control unit 122 to the display device 140. The display control unit 126 further outputs an overhead image generated by a below-described generation unit 127 to the display device 140.

An acquisition unit 125 acquires position information of a plurality of points on a plane face representing an image-capturing range of the image-capturing unit 111. For example, the acquisition unit 125 acquires coordinate values of a plurality of points on a two-dimensional coordinate representing a panoramic image from the input device 130. The panoramic image is a two-dimensional image illustrating an image-capturing range that can be captured by the image-capturing device 110 by changing the image-capturing direction. For example, the panoramic image can be generated by combining a plurality of images captured by the image-capturing device 110 while changing the image-capturing direction. In the present exemplary embodiment, either the image-capturing device 110 or the client apparatus 120 may play a major role in generating the panoramic image.

An example of the panoramic image displayed on the display device 140 is illustrated in FIG. 4. A user uses the input device 130 to specify a plurality of points in the panoramic image displayed on the display device 140. For example, the user can operate a mouse (input device 130) to move a mouse pointer in the panoramic image displayed on a display monitor (display device 140) and specify a point in the panoramic image by clicking the mouse at a desired point. Alternatively, the user may execute a touch operation on a position in the panoramic image displayed on a touch display (i.e., a display device 140 also serving as an input device 130) to specify a position in the panoramic image. The acquisition unit 125 acquires the coordinates that represent a position of the point in the panoramic image specified as the above.

Figure 5:
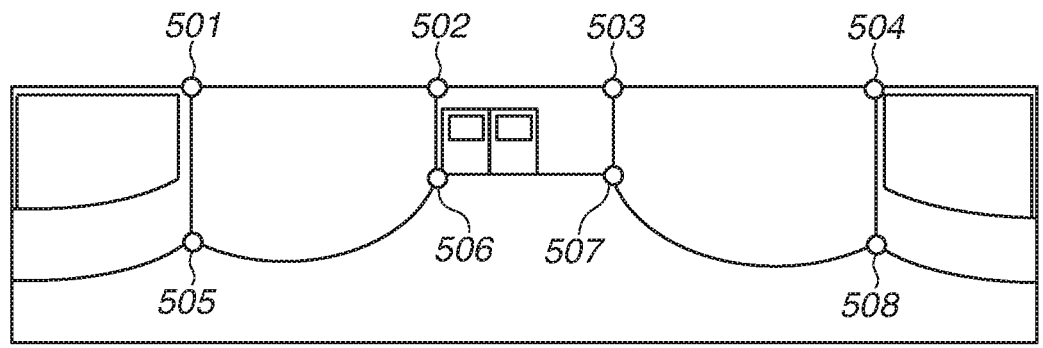
FIG. 5 is a diagram illustrating a state where positions of corners of a room are specified in the panoramic image.

FIG. 5 is a diagram illustrating a state where a plurality of points in the panoramic image is specified. In FIG. 5, points 501 to 508 are the points specified in the panoramic image by the user. In the example illustrated in FIG. 5, the user specifies positions in the panoramic image corresponding to eight vertexes of a rectangular parallelepiped-shaped room. The acquisition unit 125 acquires respective coordinates of the points 501 to 508 on the two-dimensional coordinate representing the positions in the panoramic image.

Figure 7:
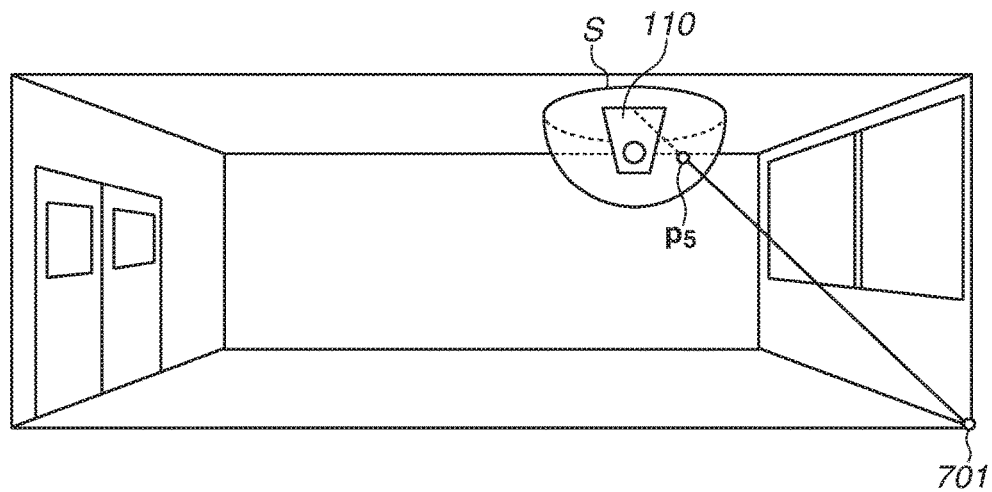
FIG. 7 is a diagram illustrating a positional relationship between the point p5 arranged on the spherical coordinate S and a corner of the room.

Based on the position information acquired by the acquisition unit 125, an arrangement unit 124 arranges the specified points on a spherical coordinate corresponding to the image-capturing range of the image-capturing unit 111. This spherical coordinate is a three-dimensional coordinate on which the image-capturing direction of the image-capturing device 110 is expressed. As illustrated in FIG. 7, the image-capturing direction of the image-capturing device 110 can be expressed by setting a spherical coordinate S having the image-capturing device 110 at the center. For example, the image-capturing direction for capturing a corner 701 of the room in FIG. 7 is expressed by a position p5 on the spherical coordinate S.

The spherical coordinate S will be described in detail with reference to FIG. 6A. In the spherical coordinate S illustrated in FIG. 6A, an origin O represents a position of the image-capturing device 110. A hemispherical face of the spherical coordinate S is an aggregation of points that represents image-capturing directions in which the image-capturing device 110 can capture images. The spherical coordinate S may have a spherical face instead of the hemispherical face illustrated in the example in FIG. 6A. For example, a position on the spherical coordinate S can be expressed by a pan angle and a tilt angle.

Figure 6A:
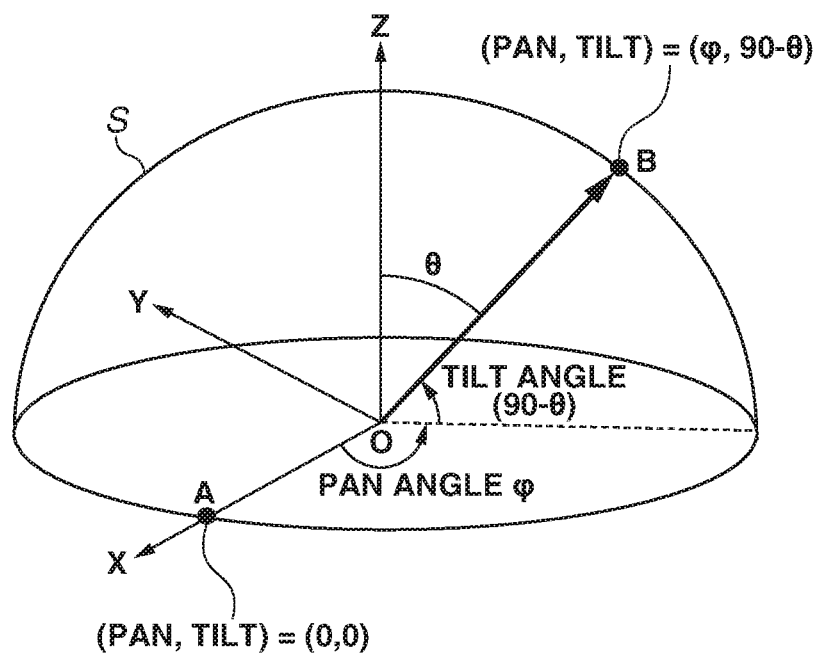
FIGS. 6A and 6B are diagrams illustrating points p1 to p8 arranged on a spherical coordinate S.

In the example in FIG. 6A, a point A on the spherical coordinate S represents a reference direction (i.e., a so-called home position) of the image-capturing direction of the image-capturing device 110. A point B represents a current image-capturing direction of the image-capturing device 110. The point B can be expressed by an angle φ that moves in the pan direction from the point A and an angle 90−θ that moves in the tilt direction from the point A. In other words, when the coordinates of the point A is expressed as (pan, tilt)=(0, 0), the coordinates of the point B can be expressed as (pan, tilt)=(θ, 90−θ).

As described above, the image-capturing direction of the image-capturing device 110 can be expressed by the coordinate values on the spherical coordinate S. The image-capturing direction of the image-capturing device 110 may be expressed by the coordinate values (e.g., X-coordinate, Y-coordinate, and Z-coordinate) that represent positions on the axes (e.g., X-axis, Y-axis, and Z-axis) indicating three different directions, instead of being expressed by the pan angle and the tilt angle.

The arrangement unit 124 arranges the points 501 to 508 specified in the panoramic image of FIG. 5 on the spherical coordinate S. The arrangement unit 124 arranges a point specified in the panoramic image on a position on the spherical coordinate S corresponding to the image-capturing direction indicated by that specified point.

Figure 6B:
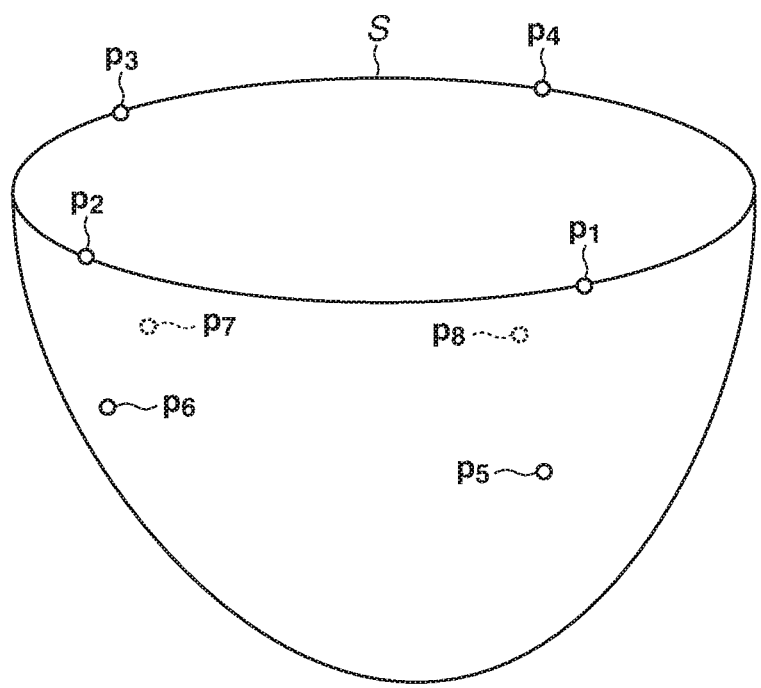

In the panoramic images illustrated in FIGS. 4 and 5, the vertical direction represents a tilt direction whereas the horizontal direction represents a pan direction. As described above, a position of the point in the panoramic image can be expressed by the pan angle and the tilt angle of the image-capturing device 110. For example, the arrangement unit 124 can arrange the specified point in a corresponding position on the spherical coordinate S by expressing the position of the point specified in the panoramic image by the pan angle and the tilt angle. FIG. 6B is a diagram illustrating a state where the specified points 501 to 508 are arranged on the spherical coordinate S. The points 501 to 508 in FIG. 5 correspond to points p1 to p8 in FIG. 6B.

Figure 8:
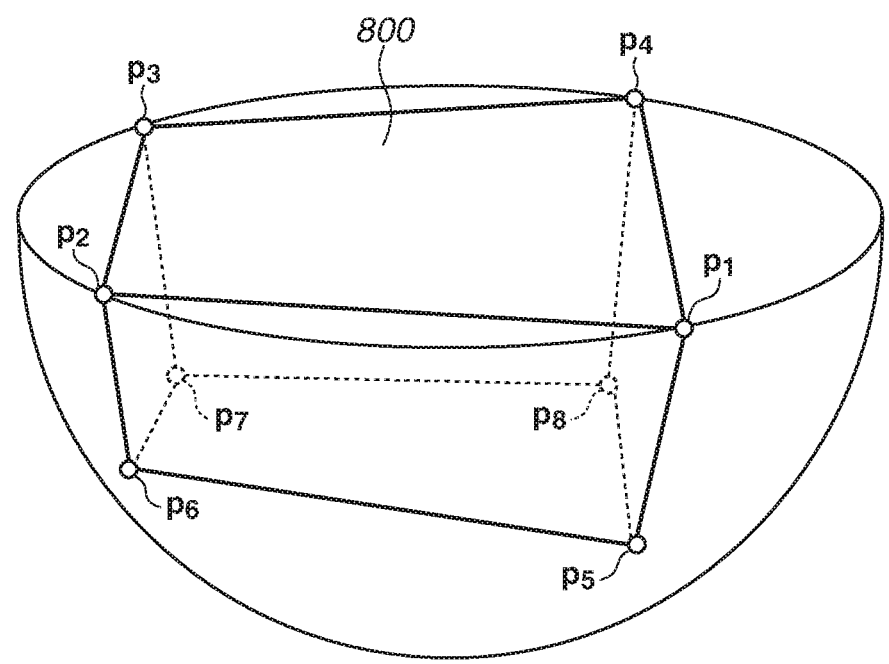
FIG. 8 is a diagram illustrating a three-dimensional shape generated by connecting the points p1 to p8.

A correction unit 123 corrects positions of a plurality of points on the spherical coordinate S in order to form a three-dimensional shape having a plurality of points arranged on the spherical coordinate S as vertexes into a predetermined three-dimensional shape. As illustrated in FIG. 8, positions of the points p1 to p8 on the spherical coordinate S are corrected in order to transform a three-dimensional shape formed by connecting the points arranged on the spherical coordinate S into a predetermined three-dimensional shape. In the present exemplary embodiment, description will be given to a configuration in which a three-dimensional shape formed by connecting the points p1 to p8 is corrected and formed into a three-dimensional shape corresponding to a shape of the room in which the image-capturing device 110 is installed. In the present exemplary embodiment, a room serving as an object has a rectangular parallelepiped shape. FIG. 8 is a diagram illustrating an example of the three-dimensional shape formed by connecting the pre-corrected points p1 to p8. The arrangement unit 124 corrects the positions of the points p1 to p8 on the spherical coordinate S in order to make the three-dimensional shape illustrated in FIG. 8 be formed into a shape expressed by points p"1 to p"8 illustrated in FIG. 10. A method for correcting the positions of the points p1 to p8 will be described below in detail with reference to a flowchart in FIG. 2. Because the overhead image is created based on the positions corrected by the correction unit 123, the arrangement unit 124 and the correction unit 123 cooperatively determines a correspondence relationship between a region in the captured image and a region in the overhead image.

Figure 11:
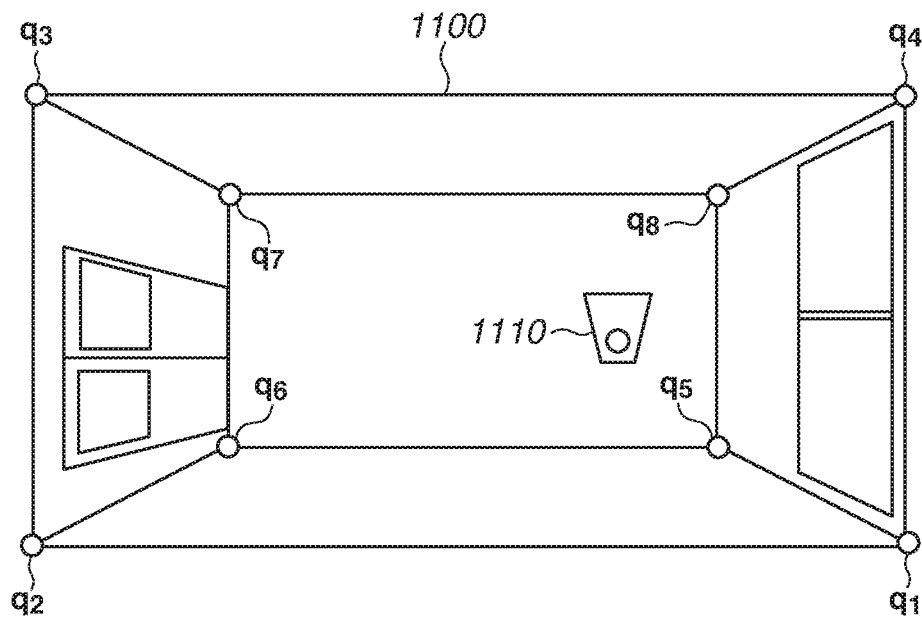
FIG. 11 is a diagram illustrating an overhead image generated based on the three-dimensional shape.

Based on a correction result of the correction unit 123, the generation unit 127 generates a plane image that corresponds to a predetermined three-dimensional shape from an image captured by the image-capturing unit 111. In the present exemplary embodiment, the generation unit 127 transforms the captured image based on the three-dimensional coordinates of the points p1 to p8 corrected by the correction unit 123 in order to generate the overhead image. An example of the overhead image generated by the generation unit 127 is illustrated in FIG. 11. Points q1 to q8 respectively correspond to the corrected points p1 to p8. The generation unit 127 respectively allocates pixel data of the panoramic image to the plane faces of the three-dimensional shape formed by connecting the corrected points p1 to p8 to generate the overhead image. For example, in the panoramic image of FIG. 5, a shape and a position of the plane image surrounded by the points 502, 503, 506, and 507 are corrected in order to make the plane image fit into a plane face surrounded by the points q2, q3, q6, and q7 in FIG. 11. The other plane faces of the rectangular parallelepiped illustrated in FIG. 11 are similarly generated by correcting the image data in the panoramic image. As described above, the overhead image can be created from the panoramic image.

Further, the client apparatus 120 may be configured as illustrated in FIG. 1B. In other words, a control unit 128 may execute the processing executed by the acquisition unit 125, the arrangement unit 124, the correction unit 123, and the generation unit 127.

The control unit 128 controls the operations of respective units of the client apparatus 120. In the present exemplary embodiment, the control unit 128 reads and executes a program stored in the storage unit 129 to control the operations of the respective units of the client apparatus 120. For example, a processor such as a CPU may be used as the control unit 128.

The storage unit 129 stores a value and data input to the client apparatus 120. In a case where the control unit 128 is configured as a processor, the storage unit 129 stores a program executed by the control unit 128. For example, a memory such as a RAM or a ROM can be used as the storage unit 129. Alternatively, a storage medium such as a HDD may be used as the storage unit 129. Furthermore, a removable media such as a flash memory or a memory card may be used as the storage unit 129.

Subsequently, processing for generating the overhead image executed by the client apparatus 120 according to the present exemplary embodiment will be described with reference to the flowcharts in FIGS. 2A and 2B. In a configuration in which a processor is included in the control unit 128 of the client apparatus 120, the processor functions as a computer. Respective pieces of processing illustrated in FIGS. 2A and 2B are realized when the processor loads and executes a program stored in the storage unit 129 according to the processing steps illustrated in FIGS. 2A and 2B. Alternatively, all or a part of the processing illustrated in FIGS. 2A and 2B may be executed by the hardware.

First, in step S201, the client apparatus 120 acquires position information of the point specified in the image illustrating the image-capturing range of the image-capturing device 110. For example, coordinates that represents a position of the point specified in the panoramic image are acquired. For example, a user specifies a position representing a vertex of the rectangular parallelepiped shape (i.e., a corner of the room) from the panoramic image representing an internal state of the rectangular parallelepiped-shaped room. In step S201, the display control unit 126 may control the display device 140 to display a message prompting the user to specify the position of the vertex of the object having a three-dimensional shape in the panoramic image.

FIG. 3 is a side view of the room having a window and a door, illustrating a state where the image-capturing device 110 is installed inside of the room. FIG. 4 is a diagram illustrating a panoramic image generated by connecting a plurality of images captured by the image-capturing device 110 while changing the image-capturing direction in the pan-tilt direction in the state illustrated in FIG. 3. This panoramic image represents an image-capturing range in which the image-capturing device 110 can capture the image. A horizontal axis and a vertical axis of the panoramic image illustrated in FIG. 4 respectively correspond to the pan direction and the tilt direction. Therefore, when a two-dimensional coordinate system 400 that makes an upper left corner of the panoramic image as a coordinate origin is defined, an optional point in the panoramic image can be expressed by two-dimensional coordinates of "pan" and "tilt". For example, an optional point 401 in FIG. 4 can be expressed as (pan, tilt)=(x1, y1).

The positions of the corners of the room captured in the panoramic image displayed on the display device 140 are illustrated in FIG. 5. In the present exemplary embodiment, because a room that can be expressed by a rectangular parallelepiped is specified as an object, a room with eight corners is captured in the panoramic image. In FIG. 5, respective points 501 to 508 are the corners of the room described in the preset exemplary embodiment. The user controls the input device 130 to click and specify the points 501 to 508 in the panoramic image. Based on the positions clicked by the user, the acquisition unit 125 of the client apparatus 120 acquires the two-dimensional coordinates of the corners 501 to 508 of the room captured in the panoramic image.

In the present exemplary embodiment, as illustrated in FIG. 4, although a panoramic image respectively taking the pan direction and the tilt direction as the horizontal axis and the vertical axis is used, an image that represents the image-capturing range of the image-capturing device 110 is not limited to the above. For example, a wide-angle image captured by using a fisheye lens may be used.

Further, in the present exemplary embodiment, the two-dimensional coordinates are acquired based on the operation of the user. The configuration is not limited thereto. The image-capturing device 110 or the client apparatus 120 may automatically detect the corners of the room from the panoramic image.

For example, an interior of the room is captured by the image-capturing device 110 after marks in a particular shape or color are placed at the corners of the room, so that positions of the corners of the room are detected from the captured image. The image-capturing device 110 or the client apparatus 120 can acquire the positions of the corners of the room in the captured image or the panoramic image by detecting the marks from the captured image or the panoramic image that is generated from the captured image. These marks are objects having a predetermined color or pattern. The acquisition unit 125 acquires the position information of the objects having the predetermined color or pattern. In a case where the positions of the corners of the room are detected by the image-capturing device 110, the client apparatus 120 acquires the position information of the corners of the room from the image-capturing device 110.

As a method for detecting the positions of the corners of the room, for example, there is provided a method in which pattern matching of the above-described mark information (i.e., pattern shape) previously registered on the client apparatus 120 is executed on data acquired from raster-scanning processing of the captured image captured by setting the marks at the corners of the room. Further, for example, raster-scanning is executed on the captured image captured by setting red marks at the corners of the room, so that the red marks are detected by threshold processing based on the values of red, green, and blue (RGB). At this time, color of the marks may be other than red.

Alternatively, the corners of the room may be automatically detected without placing the marks. For example, a point at which at least three lines intersect with each other is detected from the panoramic image, and that detected point may be determined to be a corner of the room. Further, the user may confirm a result of the automatic detection and determine whether to actually regard the detected point as a corner of the room.

Next, the arrangement unit 124 arranges the two-dimensional coordinates of the points acquired in step S201 on the spherical coordinate that represents the direction of the image-capturing device 110. As described above, in step S202, the position information acquired in step S201 is reflected on the spherical coordinate. In a case where the position information in which a position specified in the panoramic image is expressed by the pan angle and the tilt angle is acquired in step S201, the specified point is arranged in a position corresponding to the pan angle and the tilt angle in the spherical coordinate S.

The arrangement method is not limited to the above. For example, the position information of the point specified in the panoramic image may be acquired as an x-y coordinate on a plane of an X-Y coordinate corresponding to the panoramic image. In this case, conversion information used for converting the coordinate values on the plane of the X-Y coordinate into the coordinates on the spherical coordinate S may be previously stored in the storage unit. The specified point may be arranged on the spherical coordinate S by converting the position information of the point specified in the panoramic image into the coordinates on the spherical coordinate S based on the conversion information. A method for arranging the specified point on the spherical coordinate is not limited in particular.

As illustrated in FIG. 6B, the arrangement unit 124 arranges the points p1 to p8 corresponding to the points specified in the panoramic image on the spherical coordinate S.

FIG. 7 is a diagram illustrating a positional relationship between the spherical coordinate S, the point p5 arranged on the spherical coordinate S, and the corner 701 of the room. As illustrated in FIG. 7, the corner 701 of the room exists in a position on a straight line that connects the origin of the spherical coordinate S and the point P5. In other words, the point p5 represents a direction of the corner 701 of the room seen from a side of the image-capturing device 110. The same can be also said for the points other than the point p5. In other words, directions of the corners of the room seen from the side of the image-capturing device 110 can be identified by executing the acquisition processing of the coordinates of the specified points in step S201 and the processing for arranging the acquired coordinates on the spherical coordinate S in step S202.

Further, in the present exemplary embodiment, the panoramic image is used in order to acquire the coordinates in step S201 and to arrange the coordinates on the spherical coordinate S in step S202. The configuration is not limited thereto. For example, the position information of the corners of the room may be acquired by driving the image-capturing device 110 to capture the corners of the room. The positions of the corners of the room in the captured range captured by the image-capturing device 110 may be identified based on the pan angle and the tilt angle of the image-capturing device 110 that changes the image-capturing direction in order to capture the corner of the room and the positions of the corners of the room in the captured image captured in that image-capturing direction.

Next, in step S203, the arrangement unit 124 converts the coordinate values of the specified point in the spherical coordinate S into the coordinate values in the three-dimensional coordinate. The spherical coordinate S can be converted to the three-dimensional coordinate through the following formula 1.

<Formula 1>
$$\begin{pmatrix} x \\ y \\ z \end{pmatrix} = \begin{pmatrix} \sin\theta \cos\phi \\ \sin\theta \sin\phi \\ \cos\theta \end{pmatrix} \quad (1)$$

At this time, the spherical coordinate S represents a unit sphere having a radius of "1". As illustrated in FIG. 6A, the coordinates of the specified point on the spherical coordinate S is expressed as (pan, tilt)=($\phi$, 90−$\theta$). An angle $\theta$ is a difference between 90 degrees and the tilt angle of the specified point (90°−tilt angle of specified point). Further, an angle $\phi$ is the pan angle of the specified point.

By executing the above processing steps, positions of the points p1 to p8 on the spherical coordinate S can be expressed by three-dimensional vectors v1 to v8.

Next, in step S204, the client apparatus 120 selects a three-dimensional shape as a correction target. In the present exemplary embodiment, a rectangular parallelepiped is selected as a predetermined three-dimensional shape conforming to the shape of the room regarded as the object. The arrangement unit 124 selects the three-dimensional shape as a correction target. Alternatively, the above selection may be executed by the correction unit 123. In the present exemplary embodiment, the user is allowed to select a predetermined three-dimensional shape from among the three-dimensional shapes stored in the storage unit 129 of the client apparatus 120. As described above, a predetermined three-dimensional shape is selected based on the user's operation. Alternatively, a predetermined three-dimensional shape may be selected based on the number of specified points (corners of the room) acquired by the acquisition unit 125 in step S201. For example, if the number of the specified points is 8, a rectangular parallelepiped is selected. In addition, for example, if the number of the specified points is 14, the three-dimensional shape may be identified as an L-shaped three-dimensional shape, which will be described in a second exemplary embodiment with reference to FIG. 16. Further, the position information of the specified points may be acquired after a predetermined three-dimensional shape is selected. Furthermore, the three-dimensional shape as a correction target may be selected after the three-dimensional shape is generated in step S205.

Next, the arrangement unit 124 of the client apparatus 120 connects the points p1 to p8 with each other to generate a three-dimensional shape. At this time, as to how the points p1 to p8 are connected may be determined according to an order in which the user clicks the corners of the room, or may be determined according to a shape or color of the mark. A three-dimensional shape 800 generated by connecting the points p1 to p8 is illustrated in FIG. 8.

In step S206, the correction unit 123 moves the points p1 to p8 by multiplying the magnitudes of the three-dimensional vectors v1 to v8 by a constant number, and transforms the three-dimensional shape 800 into a predetermined three-dimensional shape. Herein, "predetermined three-dimensional shape" refers to the three-dimensional shape selected in step S205.

In step S207, the correction unit 123 determines whether the three-dimensional shape 800 has become a predetermined three-dimensional shape. If it is determined that the three-dimensional shape 800 has become a predetermined three-dimensional shape (YES in step S207), the processing proceeds to step S208. On the other hand, if it is determined that the three-dimensional shape 800 has not become a predetermined three-dimensional shape (NO in step S207), the processing in step S206 is executed repeatedly.

Transformation processing executed in step S206 and determination processing executed in step S207 will be described below in detail with reference to FIG. 2B.

In a case where the correction unit 123 determines that the three-dimensional shape 800 has become a predetermined three-dimensional shape, in step S208, the generation unit 127 transforms the captured image into the overhead image based on the transformed three-dimensional shape. Transformation of the captured image is realized when the planes of the three-dimensional shape are transformed after the captured images are projected on the transformed three-dimensional shape. A method for transforming respective planes of the three-dimensional shape will be described below in detail with reference to FIGS. 10 and 11.

In addition, as described above, each of the planes of the three-dimensional shape corresponds to each of the regions in the overhead image. Accordingly, the correction unit 123 functions as a determination unit that determines respective regions in the captured image corresponding to respective regions in the overhead image.

Through the above-described processing, the client apparatus 120 can generate the overhead image.

Herein, the processing for moving the vertexes of the three-dimensional shape executed in step S206 and the determination processing executed in step S207 in FIG. 2A will be described in detail with reference to the flowchart and the diagram illustrated in FIGS. 2B and 2C.

FIG. 2C is a conceptual diagram of the processing executed in step S206. The processing with respect to a plane p1/p2/p3/p4 of the spherical coordinate S in FIG. 8 is illustrated in FIG. 2C. Further, FIG. 2B illustrates a processing flow.

A diagram on the upper side of FIG. 2C illustrates a state where the points p1, p2, p3, and p4 are arranged on the spherical coordinate S.

First, in step S211, the correction unit 123 enlarges the diagram illustrated on the upper side of the FIG. 2C, and creates a diagram illustrated at the center of FIG. 2C. A diagram p'1/p'2/p'3/p'4 illustrated at the center of FIG. 2C can be created when the magnitudes of vectors representing the points p1, p2, p3, and p4 are enlarged to a predetermined magnification by making a center O of a circle corresponding to the spherical coordinate S as a starting point. The circle corresponding to the spherical coordinate S is also enlarged with the same magnification.

Next, in step S212, one vertex is selected from vertexes of a square shape p'1/p'2/p'3/p'4. Next, in step S213, the correction unit 123 determines whether an angle formed by the selected vertex is greater than 90 degrees. In a case where the angle formed by the selected vertex is greater than 90 degrees (YES in step S213), the processing proceeds to step S214. In step S214, the correction unit 123 moves a position of the vertex to the outside of the enlarged circle and sets a new point. For example, as illustrated in the diagram on the lower side of FIG. 2C, in a case where the angle formed by the selected vertex p'2 is greater than 90 degrees, the correction unit 123 moves a position of the vertex to the outside of the enlarged circle and sets a new point q2. At this time, the magnitude of a vector representing the vertex p'2 is enlarged by making the center of the circle as a starting point in order to set a new point as a position of the vertex. In other words, the point q2 corresponding to the post-moved point p'2 is set to a position on an extended line that connects the center O of the circle and the pre-moved point p'2.

On the other hand, in a case where the angle formed by the selected vertex is equal to or less than 90 degrees (NO in step S213), the processing proceeds to step S215. In step S215, the correction unit 123 sets a new point at a position inside of the enlarged circle. For example, in a case where the angle formed by a selected vertex p'4 is equal to or less than 90 degrees, as illustrated in the diagram on the lower side of FIG. 2C, the correction unit 123 moves a position of the vertex to the inside of the enlarged circle and sets a new point q4. At this time, the magnitude of a vector representing the vertex p'4 is reduced by making the center of the circle as a starting point in order to set the new point as a position of the vertex p'4. In other words, the post-moved point p'4 exists in a position on a line that connects the center O of the circle and the pre-moved point p'4.

As described above, a vertex is moved in such a manner that the post-moved vertex is positioned on a straight line that connects the selected vertex and the center of the circle. At the same time, the vertex is moved in such a manner that the sides thereof are orthogonal to each other. Therefore, a rectangular shape having the same aspect ratio as that of the actual room can be generated.

In the example illustrated in FIG. 2C, for the sake of convenience, the processing executed on a plane face has been described as an example. However, the same is also applicable to the processing executed on a three-dimensional shape such as a rectangular parallelepiped. A vertex is moved to position on a straight line that connects the selected vertex and the center of the spherical coordinate S. At the same time, the vertex is moved in such a manner that the sides thereof are orthogonal to each other. Therefore, a rectangular parallelepiped having the same three-dimensional aspect ratio as that of the actual room can be generated.

In step S216, the correction unit 123 determines whether the angles of all of the points have become 90 degrees. In a case where the angles of all of the points have not become 90 degrees (NO in step S216), the processing in step S212 and subsequent steps are repeated. The processing is ended when the angles of all of the points have become 90 degrees.

Figure 10:
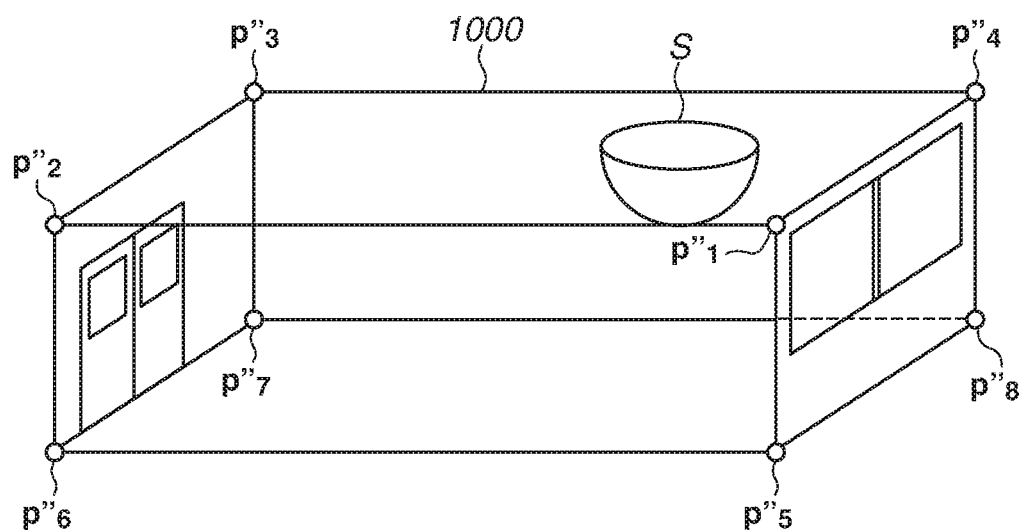
FIG. 10 is a diagram illustrating a state where a captured image is projected on a transformed three-dimensional shape.

As described above, a rectangular shape p"1/p"2/p"3/p"4 illustrated in the diagram on the lower side of FIG. 2C can be acquired. This rectangular shape p"1/p"2/p"3/p"4 corresponds to a plane q1/q2/q3/q4 of the overhead image illustrated in FIG. 11. A three-dimensional shape that is generated by connecting the rectangular shapes generated in a same manner as the rectangular shape p"1/p"2/p"3/p"4 is illustrated in FIG. 10. Further, a position of the origin O with respect to the rectangular shape p"1/p"2/p"3/p"4 illustrated in the diagram on the lower side of FIG. 2C corresponds to a position of the image-capturing device 110 in the room.

As described above, the correction unit 123 corrects a shape of the three-dimensional shape 800 formed by connecting the points arranged on the spherical coordinate S.

To be more specific, the three-dimensional shape 800 can be transformed to a rectangular parallelepiped when the points p1 to p8 are moved to make a cost function E(a) expressed by the following formula 2 be minimized.

<Formula 2>

$$E(a) = \sum_{i=1}^{6} e_i(a) + \lambda d(a) \tag{2}$$

A value "a" in the formula 2 is a value acquired from vectorization of coefficients "$a_n$" (n=1, ..., 8) of three-dimensional vectors v1 to v8. At this time, coordinates of a point "$p_n$" can be expressed by a product of the respective values of "$a_n$" and "$v_n$".

Further, a value "$e_i$" in the formula 2 will be described with reference to FIG. 9. A value "$e_i$" represents a square sum of the inner product of two vectors that form each of interior angles of a plane "i" that is formed when the points p1 to p8 are connected to each other. The value "$e_i$" can be expressed by the following formula 3.

<Formula 3>

$$e_i(a) = \sum_{j=1}^{4} \{(a_{ij1} v_{ij1} - a_{ij2} v_{ij2}) \cdot (a_{ij3} v_{ij3} - a_{ij2} v_{ij2})\}^2 \tag{3}$$

In the formula 3, a value "j" is an index that represents an interior angle of the plane "i". Further, in the formula 3, a value "ijm (m=1, 2, 3)" is an index that represents three points constituting the two vectors that form the interior angle "j" of the plane "i". A value "m" represents a starting point of the two vectors when "m" is equal to "2" (m=2), and represents an ending point when "m" is equal to "1" or "3" (m=1, 3).

When the value "$e_i$" approximates to 0, each of the interior angles of the plane "i" approximates to 90 degrees, and thus the plane i approximates to a rectangular shape. Therefore, a rectangular parallelepiped can be generated when the planes 1 to 6 respectively approximate to the rectangular shape. Further, a value d(a) in the formula 2 represents an amount that approximates Euclidean norm of one of the sides of the rectangular parallelepiped formed by connecting the points p1 to p8 to a constant "C". The value d(a) can be calculated by the following formula 4.

<Formula 4>

$$d(a) = \{\|a_1 v_1 - a_2 v_2\|_2 - C\}^2 \tag{4}$$

A distance between the points p1 and p2 approximates to the constant "C" when the value d(a) approximates to 0. Further, a value "λ" is a parameter for making an adjustment of a weight of a cost.

A rectangular parallelepiped having the sides the sizes of which are specified by the constant "C" can be generated by minimizing the cost function E(a) in which the above two costs $e_i(a)$ and d(a) are summed up.

In the present exemplary embodiment, a steepest descent method is employed in order to minimize the cost function E(a). The method is not limited thereto. Any algorithm for optimizing a nonlinear function can be employed therefor. An algorithm for minimizing the cost function based on the steepest descent method is described as follows.

1. Set an initial value as follows. k=1, $a^k = [1\ 1\ \ldots\ 1]^T$
2. Calculate "nabla $E(a^k)$" through the following formula 5.

<Formula 5>

$$\nabla E(a^k) = \left[ \frac{\partial E(a^k)}{\partial a_1^k}\ \frac{\partial E(a^k)}{\partial a_2^k}\ \ldots\ \frac{\partial E(a^k)}{\partial a_8^k} \right]^T \quad (5)$$

3. Update a variable "a" according to the formula 6.

<Formula 6>

$$a^{k+1} = a^k \alpha \nabla E(a^k) \quad (6)$$

4. End the processing if the following formula 7 is satisfied.

<Formula 7>

$$\frac{\partial E(a^k)}{\partial a_n^k} < \varepsilon\ (n = 1, 2, \ldots, 8) \quad (7)$$

5. Let "k" be equal to "k+1" (k=k+1). If "k" is not "$k_{max}$", the processing returns to 2. If "k" is "$k_{max}$", the processing is ended.

In the above algorithm, the processing in 1 to 3 corresponds to the transformation processing in step S206. Further, the processing in 4 and 5 corresponds to the determination processing in step S207. At this time, the three-dimensional aspect ratio of the transformed three-dimensional shape conforms to the three-dimensional aspect ratio of the room as an object. Further, a position of the origin O of the spherical coordinate S when making the three-dimensional shape as a reference corresponds to a position of the image-capturing device 110 installed inside of the room as the object. Further, in the present exemplary embodiment, values previously set to the client apparatus 120 are used as the constants C, λ, ε, and α. The configuration is not limited thereto. The respective values may be specified by the user every time the overhead image is generated.

Through the above processing, the correction unit 123 can correct a shape of the three-dimensional shape 800 formed by connecting the points arranged on the spherical coordinate S.

Next, the overhead image generation processing executed in step S208 illustrated in FIG. 2A will be described.

The generation unit 127 generates an overhead image from a captured image based on the three-dimensional shape transformed in step S206. For example, the generation unit 127 projects the captured image on a plane P"2/p"3/p"7/p"6 of the three-dimensional shape transformed in step S206. The generation unit 127 projects the captured image of a region corresponding to the plane P"2/p"3/p"7/p"6 thereon. The generation unit 127 projects a captured image of an image-capturing region formed by connecting the points 502, 503, 507, and 506 corresponding to the points P"2, p"3, p"7, and p"6 on the plane P"2/p"3/p"7/p"6. FIG. 10 is a diagram illustrating a state where the captured images are projected on the planes of the transformed three-dimensional shape. Further, the generation unit 127 transforms the planes of the three-dimensional shape on which the captured images are projected in order to generate the overhead image as illustrated in FIG. 11. For example, the generation unit 127 transforms the captured image projected on the plane P"2/p"3/p"7/p"6 to generate an image of the plane q2/q3/q7/q6 illustrated in FIG. 11.

In the present exemplary embodiment, the generation unit 127 does not project the captured image on a plane p"1/p"2/p"3/p"4 where the image-capturing device 110 is installed. Therefore, an interior of the room can be confirmed through a ceiling (i.e., plane p"1/p"2/p"3/p"4) when the overhead image is generated. Alternatively, a transparent captured image, i.e., a captured image having the transparency higher than that of the captured images projected on the other planes, may be projected on the plane p"1/p"2/p"3/p"4 in order to make the images on the other planes be seen through.

As described above, the generation unit 127 projects the captured images of the region corresponding to the planes captured by the image-capturing device 110 on the respective planes of the predetermined three-dimensional shape formed by connecting the points the positions of which are corrected by the correction unit 123 (e.g., see FIG. 10). Then, the generation unit 127 generates a plane image (e.g., see FIG. 11) that expresses a predetermined three-dimensional shape by changing the shapes of the planes on which the captured images are projected.

A method for correcting the captured images projected on the planes of the three-dimensional shape will be described in detail with reference to FIGS. 10 and 11. The points q1 to q8 in FIG. 11 are points corresponding to the points p"1 to p"8 in FIG. 10. In other words, an operation for transforming a plane composed of four points in FIG. 10 into an image surrounded by the corresponding four points in FIG. 11 is executed with respect to each of the planes of the three-dimensional shape, so that the overhead image is generated.

Further, when the three-dimensional shape is generated, a position of the image-capturing device 110 installed inside of the room as an object is acquired. Therefore, the display control unit 126 may superimpose and display an image 1110 that represents a position of the image-capturing device 110 on an overhead image 1100. As described above, the display control unit 126 executes control processing for displaying the image 1110 representing a position of the image-capturing device 110 in the plane image generated by the generation unit 127 on the overhead image. The image 1110 that represents a position of the image-capturing device 110 may be selected by the user from among a plurality of image candidates, or may be automatically displayed on the overhead image according to the type of the installed image-capturing device 110 by determining the type thereof. Further, the image-capturing direction of the image-capturing device 110 may be expressed by the orientation of the image 1110 that represents the position of the image-capturing device 110. As described above, the display control unit 126 can execute control processing for displaying the image that represents the image-capturing direction of the image-capturing device 110 on the overhead image generated by the generation unit 127.

In order to transform the planes of the three-dimensional shape, conversion expressed by the following formula 8 is executed.

<Formula 8>

$$\begin{bmatrix} sq_x \\ sq_y \\ s \end{bmatrix} = \begin{bmatrix} h_{11} & h_{12} & h_{13} \\ h_{21} & h_{22} & h_{23} \\ h_{31} & h_{32} & 1 \end{bmatrix} \begin{bmatrix} p''_x \\ p''_y \\ 1 \end{bmatrix} \quad (8)$$

In the formula 8, values $p''_x$ and $p''_y$ represent the coordinates for treating each plane of the three-dimensional shape as a single plane face, whereas values $q_x$ and $q_y$ represent the coordinates when each plane of the three-dimensional shape is displayed as the overhead image. In the formula 8, values h11 to h32 are conversion parameters that can be calculated through the following formula 9.

<Formula 9>

$$\begin{bmatrix} h_{11} \\ h_{12} \\ h_{13} \\ h_{21} \\ h_{22} \\ h_{23} \\ h_{31} \\ h_{32} \end{bmatrix} = \begin{bmatrix} p''_{x_1} & p''_{y_1} & 1 & 0 & 0 & 0 & -p''_{x_1}q_{x_1} & -p''_{y_1}q_{x_1} \\ 0 & 0 & 0 & p''_{x_1} & p''_{y_1} & 1 & -p''_{x_1}q_{y_1} & -p''_{y_1}q_{y_1} \\ p''_{x_2} & p''_{y_2} & 1 & 0 & 0 & 0 & -p''_{x_2}q_{x_2} & -p''_{y_2}q_{x_2} \\ 0 & 0 & 0 & p''_{x_2} & p''_{y_2} & 1 & -p''_{x_2}q_{y_2} & -p''_{y_2}q_{y_2} \\ p''_{x_3} & p''_{y_3} & 1 & 0 & 0 & 0 & -p''_{x_3}q_{x_3} & -p''_{y_3}q_{x_3} \\ 0 & 0 & 0 & p''_{x_3} & p''_{y_3} & 1 & -p''_{x_3}q_{y_3} & -p''_{y_3}q_{y_3} \\ p''_{x_4} & p''_{y_4} & 1 & 0 & 0 & 0 & -p''_{x_4}q_{x_4} & -p''_{y_4}q_{x_4} \\ 0 & 0 & 0 & p''_{x_4} & p''_{y_4} & 1 & -p''_{x_4}q_{y_4} & -p''_{y_4}q_{y_4} \end{bmatrix} \begin{bmatrix} q_{x_1} \\ q_{y_1} \\ q_{x_2} \\ q_{y_2} \\ q_{x_3} \\ q_{y_3} \\ q_{x_4} \\ q_{y_4} \end{bmatrix} \quad (9)$$

Figure 9:
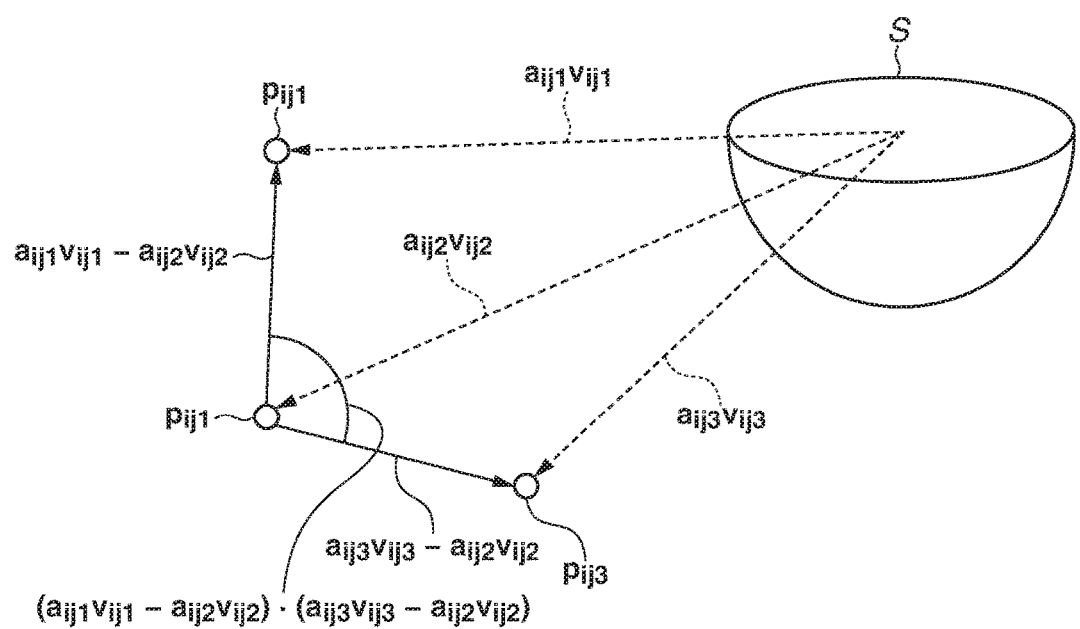
FIG. 9 is a diagram illustrating two vectors formed of an interior angle of a plane i generated by connecting the points p1 to p8.

In FIG. 9, values $p''_{x1}$, $p''_{y1}$, . . . , $p''_{x4}$, and $p''_{y4}$ represent the coordinates of four corners when each of the planes on the three-dimensional shape is treated as a single plane, whereas values $q_{x1}$, $q_{y1}$, . . . , $q_{x4}$, and $q_{y4}$ represent the converted coordinates of the four corners. In the present exemplary embodiment, the points q1 to q8 after transforming the planes of the three-dimensional shape into the overhead image are previously set to the client apparatus 120. The configuration is not limited thereto. The points q1 to q8 may be input by the user every time the overhead image is generated, or may be automatically set thereto while a ratio of the width and the depth of the room are taken into consideration. The generated overhead image is displayed to the user by the display control unit 126 via the display device 140.

In the present exemplary embodiment, the overhead image is generated by transforming the planes of the three-dimensional shape. The configuration is not limited thereto. The overhead image may be generated by creating a virtual viewpoint for looking down the three-dimensional shape and projecting the three-dimensional shape on which the captured image is projected onto a plane face.

Further, in the present exemplary embodiment, the overhead image is generated by the client apparatus 120. The configuration is not limited to the above, and the overhead image may be generated by the image-capturing device 110.

As described above, in a case where an image of an object captured by the image-capturing device is to be transformed, the object in the transformed image can be expressed into a shape desired by the user.

In a second exemplary embodiment, a method for generating an overhead image when the room as an object is expressed by an L-shape will be described. In the present exemplary embodiment, two rectangular parallelepipeds described in the first exemplary embodiment are generated and combined with each other in order to generate an L-shaped three-dimensional shape.

The system configuration of the image processing system according to the present exemplary embodiment are the same as the content described in the first exemplary embodiment, and thus description thereof will be omitted. A generation processing flow of the overhead image according to the present exemplary embodiment will be described with reference to FIG. 2A.

Figure 12:
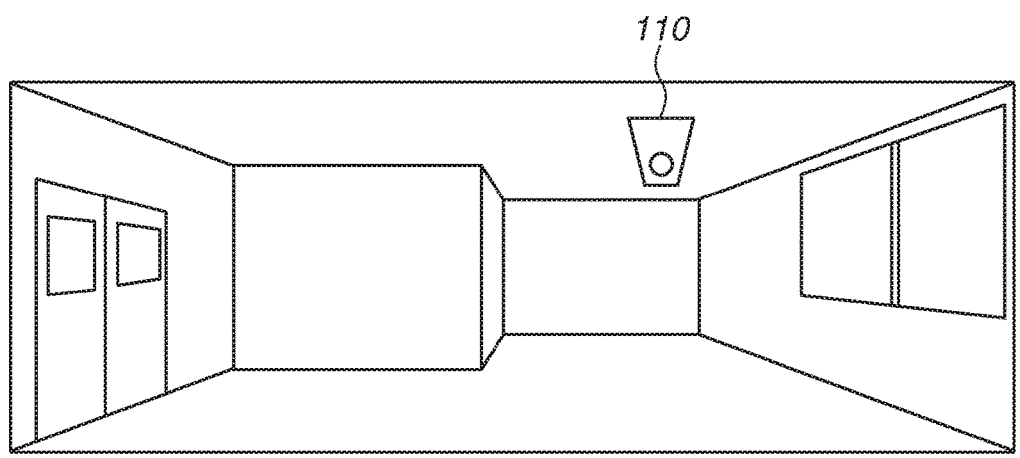
FIG. 12 is a diagram illustrating a state where an image-capturing device is installed in an L-shaped room.
Figure 13:
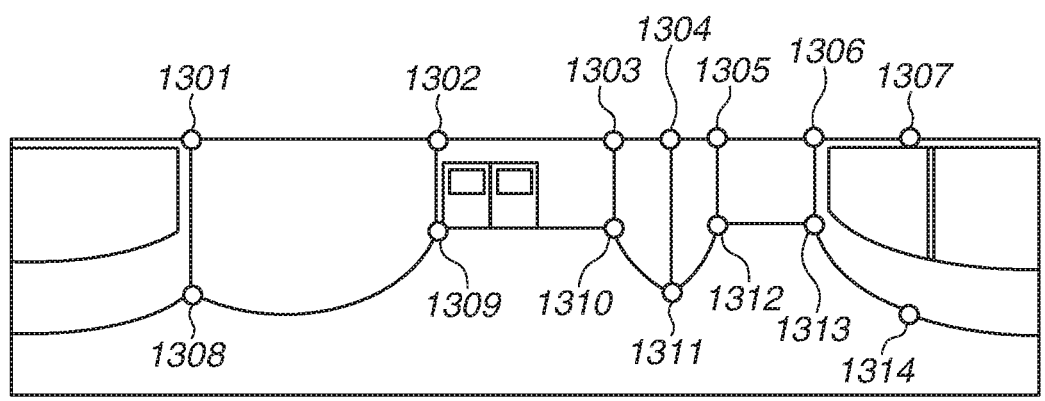
FIG. 13 is a diagram illustrating a state where positions of corners of the L-shaped room are specified in the panoramic image of the L-shaped room.

First, acquisition of the coordinates representing the corners of the room executed in step S201 according to the present exemplary embodiment will be described with reference to FIGS. 12 and 13. FIG. 12 is a diagram viewed in the lateral direction, illustrating a state where the image-capturing device 110 is installed inside of an L-shaped room having a window and a door. FIG. 13 is a diagram illustrating a panoramic image corresponding to an image-capturing range of the image-capturing device 110, which is generated by the image-capturing device 110 by driving the pan-tilt image-capturing direction in the environment illustrated in FIG. 12. Similar to the panoramic image in FIG. 4, an optional point in the panoramic image in FIG. 13 can be expressed by the two-dimensional coordinates of "pan" and "tilt". Points 1301 to 1314 in FIG. 13 represent vertexes of rectangular parallelepipeds when the L-shaped room as an object is expressed by a combination of two rectangular parallelepipeds. When the user operates the input device 130 to click the points 1301 to 1314 in the panoramic image, the acquisition unit 125 acquires the two-dimensional coordinates of the corners 1301 to 1314 of the room.

Next, in step S203, the arrangement unit 124 arranges the points 1301 to 1314 acquired by the acquisition unit 125 on the spherical coordinate S. Then, in step S203, the coordinates of respective points 1301 to 1314 on the spherical coordinate S are converted into the three-dimensional coordinates. The points on the spherical face corresponding to the points 1301 to 1314 on the two-dimensional coordinate are respectively assigned as p11 to p24.

Figure 14:
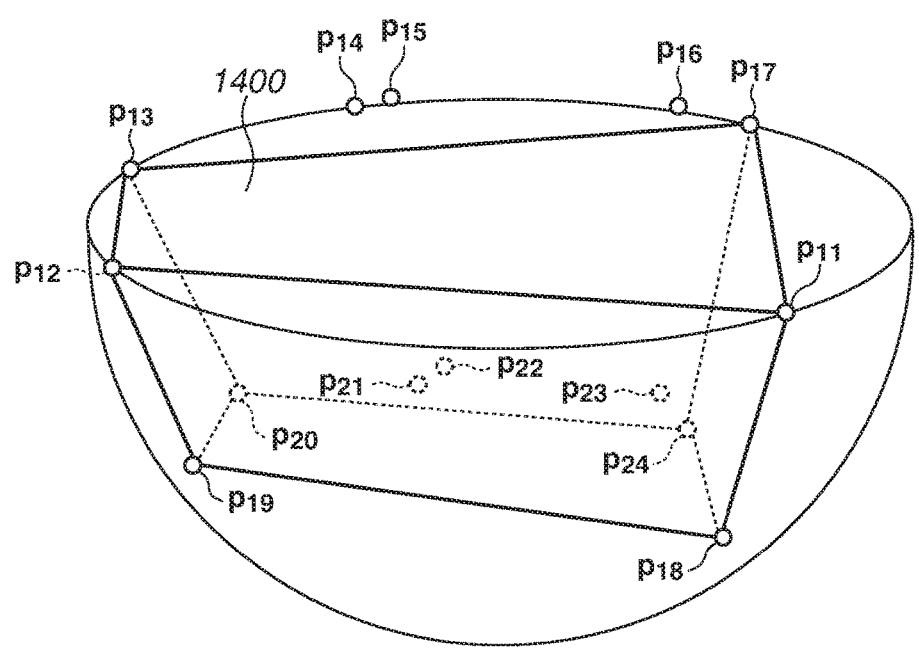
FIG. 14 is a diagram illustrating a three-dimensional shape generated by connecting the points p11, p12, p13, p17, p18, p19, p20, and p24.
Figure 15:
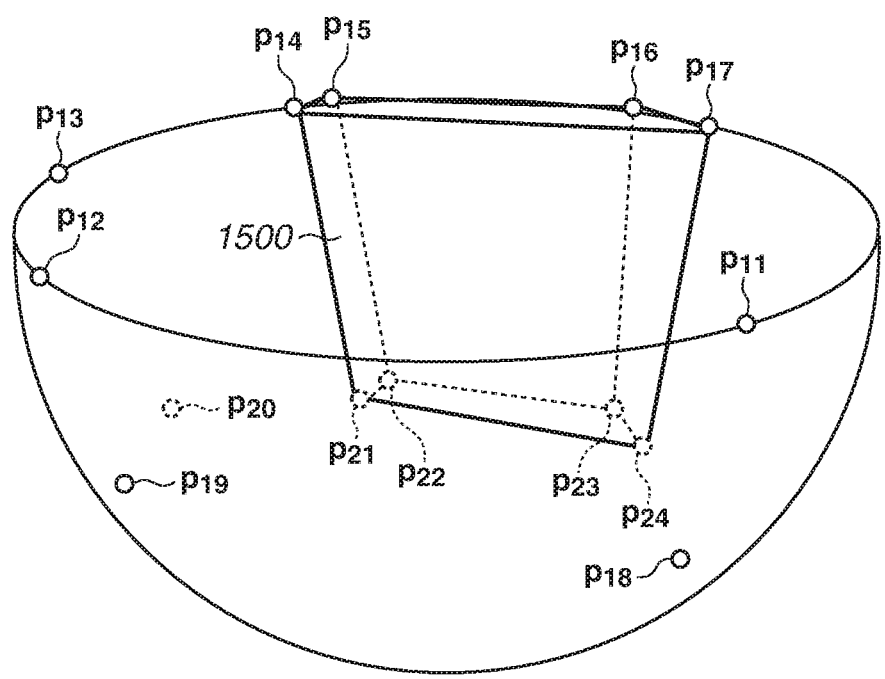
FIG. 15 is a diagram illustrating a three-dimensional shape generated by connecting points p14, p15, p16, p17, p21, p22, p23, and p24.

Next, in step S204, the client apparatus 120 selects an L-shape as a three-dimensional shape as a correction target. In the present exemplary embodiment, because the number of coordinates acquired by the acquisition unit 125 is 14, the client apparatus 120 determines that a predetermined three-dimensional shape has an L-shape. Then, in step S205, the arrangement unit 124 connects the points P11 to P24 to generate three-dimensional shapes. The client apparatus 120 connects the points p11 to p24 to generate two three-dimensional shapes. A three-dimensional shape 1400 generated by connecting the points p11, p12, p13, p17, p18, p19, p20, and p24 is illustrated in FIG. 14. Further, a three-dimensional shape 1500 generated by connecting the points p14, p15, p16, p17, p21, p22, p23, and p24 is illustrated in FIG. 15.

Next, in steps S206 and S207, the arrangement unit 124 moves the points p11 to p24 and transforms the three-dimensional shapes 1400 and 1500 into rectangular parallelepipeds. In the first exemplary embodiment, positions of a plurality of points are corrected in order to form a three-dimensional shape having all of the points arranged on the spherical coordinate S as the vertexes into a rectangular parallelepiped. On the other hand, in the present exemplary embodiment, positions of a plurality of points are corrected in order to form a three-dimensional shape having a part of the points arranged on the spherical coordinate S as the vertexes into a rectangular parallelepiped.

A method for moving the point is the same as the method described in the first exemplary embodiment, and thus description thereof will be omitted. At this time, both of the three-dimensional shapes 1400 and 1500 have the points p17 and p24. With respect to each of the three-dimensional shapes 1400 and 1500, the correction unit 123 minimizes the cost function E(a) expressed by the formula 2 by making a length of the line that connects the points p17 and p24 as the constant "C". Through the above processing, it is possible to generate two rectangular parallelepipeds having the same length of sides that connect the points p17 and p24. Then, the transformed three-dimensional shapes 1400 and 1500 are combined together, so that an L-shaped three dimensional shape is generated.

Figure 16:
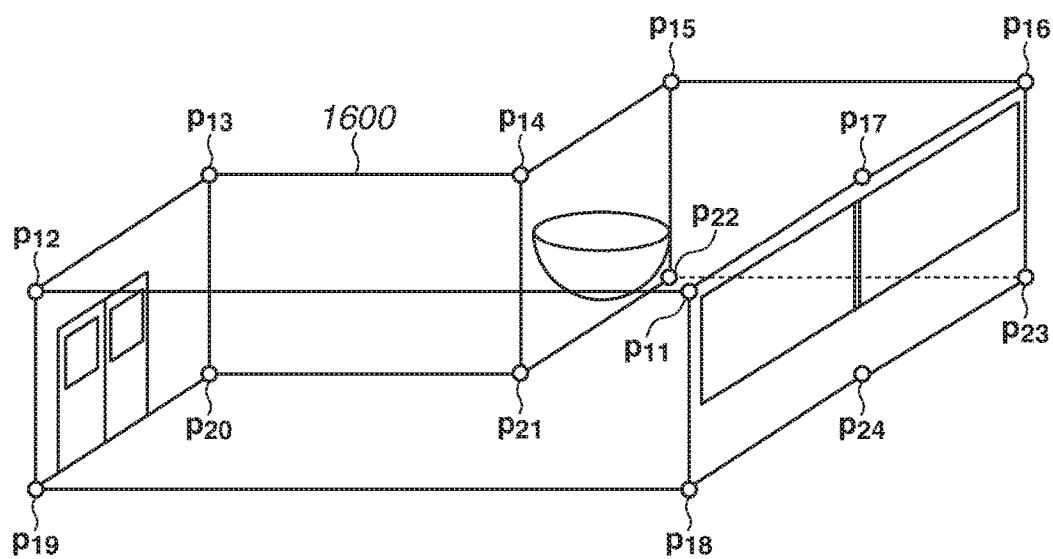
FIG. 16 is a diagram illustrating a state where a captured image is projected on a transformed L-shaped three-dimensional shape.
Figure 17:
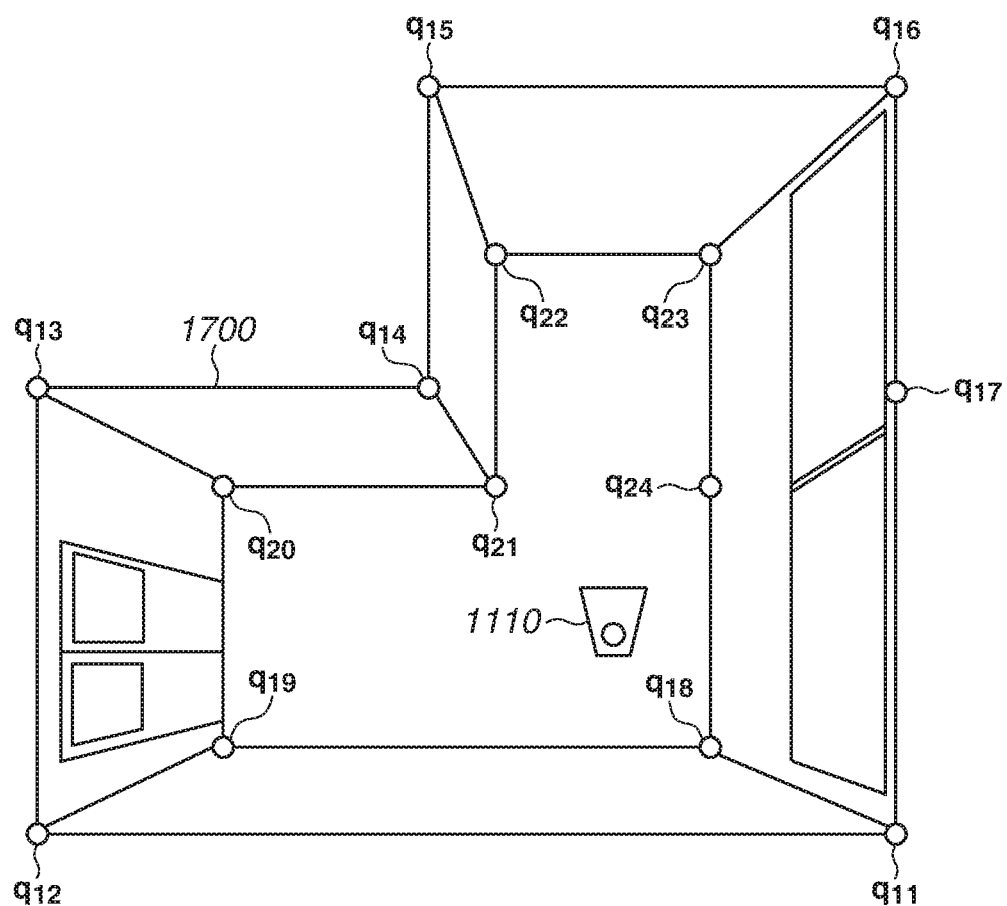
FIG. 17 is a diagram illustrating an overhead image generated based on the three-dimensional shape.

Next, in step S208, the generation unit 127 of the client apparatus 120 transforms the captured image into the overhead image based on the L-shaped three-dimensional shape. A method for transforming the captured image into the overhead image is the same as the method described in the first exemplary embodiment, and thus description thereof will be omitted. An L-shaped three-dimensional shape 1600 on which the captured images are projected is illustrated in FIG. 16. Further, an overhead image of the generated L-shaped three-dimensional shape is illustrated in FIG. 17. Points q11 to q24 in FIG. 17 represent the points corresponding to points p11 to p24 in FIG. 16.

Figure 18:
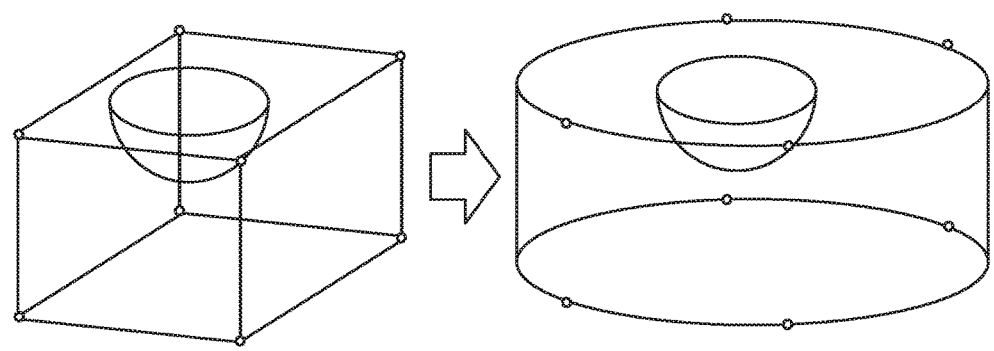
FIG. 18 is a diagram illustrating processing for generating an overhead image of a columnar-shaped room.

In the present exemplary embodiment, only the L-shaped room has been described. The configuration is not limited thereto. The present exemplary embodiment is applicable to a three-dimensional shape that can be generated by combining rectangular parallelepipeds. Further, in the first and the second exemplary embodiments, although description has been given to the processing for generating the overhead images of the rectangular parallelepiped-shaped room and the L-shaped room, it is also possible to create an overhead image of a columnar-shaped room by applying the processing described with reference to FIG. 2B. In this case, similar to the processing described in FIG. 5, the user specifies eight points in the panoramic image. Further, in step S204, the user performs settings on the client apparatus 120 in order to form a three-dimensional shape as a correction target into a columnar shape. In steps S206 and S207, as illustrated in a diagram on the left side in FIG. 18, the correction unit 123 generates a rectangular parallelepiped (or a cube) having square-shaped upper and lower planes. Further, the correction unit 123 generates a circle in which the square-shaped upper or lower plane is inscribed, and generates a columnar shape as illustrated in a diagram on the right side in FIG. 18.

In step S208, after projecting the captured images on the generated columnar shape, the generation unit 127 can generate the overhead image by correcting the images in a same manner as described in the above-described exemplary embodiments.

Further, the communication control unit 122 of the client apparatus 120 may transmit the overhead image generated by the method described in the first or the second exemplary embodiment to the image-capturing device 110 via the network. The image-capturing device 110 stores the overhead image generated by the client apparatus 120 in the storage unit 116. Then, according to an acquisition request of the overhead image received from one or more client apparatuses connected thereto, the image-capturing device 110 can distribute the stored overhead image to the client apparatus that transmits the request.

Although the exemplary embodiments according to the present invention have been described as the above, the present invention is not limited to the above exemplary embodiments, and many variations and modifications are possible within the scope of the present invention.

The present invention can be realized in such a manner that a program for realizing one or more functions according to the above-described exemplary embodiments is supplied to a system or an apparatus via a network or a storage medium, so that one or more processors in a computer of the system or the apparatus reads and executes the program. Further, the present invention can be also realized with a circuit (e.g., application specific integrated circuit (ASIC)) that realizes one or more functions.

According to the above-described exemplary embodiments, it is possible to transform an image of an object captured by the image-capturing device and express the image into a shape desired by the user.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-037436, filed Feb. 26, 2015, which is hereby incorporated by reference herein in its entirety.

What is claimed is:

1. An image processing apparatus comprising:
one or more processors; and
one or more memories storing instructions that, when executed by the one or more processors, cause the image processing apparatus to perform operations comprising:

acquiring information for identifying a position of a vertex of a plane in a captured image, the captured image including a structure composed of a plurality of planes as an object;

identifying points corresponding to positions of vertexes of the plane on a spherical coordinate that corresponds to an image-capturing range of an image-capturing unit that captures the captured image based on the information acquired by the acquiring;

correcting positions of the points on the spherical coordinate to form a three-dimensional shape having the points on the spherical coordinate as the vertexes, into a predetermined three-dimensional shape; and generating an overhead image by making a region in the captured image corresponding to the positions of the points corrected by the correcting, as a region corresponding to the plane.

2. The image processing apparatus according to claim 1, wherein the correcting corrects the positions of the points on the spherical coordinate to form the three-dimensional shape having the points on the spherical coordinate as the vertexes into a rectangular parallelepiped.

3. The image processing apparatus according to claim 1, wherein the operations further comprise:

storing information of a plurality of three-dimensional shapes, and selecting a predetermined three-dimensional shape from the plurality of the three-dimensional shapes.

4. The image processing apparatus according to claim 3, wherein the selecting selects the predetermined three-dimensional shape based on a number of points corresponding to the positions of the vertexes of the plane.

5. The image processing apparatus according to claim 1, wherein the generating corrects images of regions corresponding to a plurality of planes in the captured image so that the images correspond to the planes of the predetermined three-dimensional shape formed by connecting the plurality of the points corrected by the correcting.

6. The image processing apparatus according to claim 1, wherein the acquiring acquires a position specified by a user with respect to the captured image as the information for identifying a position of the plane.

7. The image processing apparatus according to claim 1, wherein the acquiring detects an object having a predetermined color or pattern from the captured image and acquires a position of the object having the predetermined color or pattern as the information for identifying a position of the plane.

8. The image processing apparatus according to claim 1, wherein the generating generates the overhead image on which an image representing a position of the image-capturing unit for capturing the captured image is superimposed.

9. The image processing apparatus according to claim 1, wherein the generating generates the overhead image on which an image representing an image-capturing direction of the image-capturing unit for capturing the captured image is superimposed.

10. The image processing apparatus according to claim 1, wherein the operations further comprise transmitting the overhead image generated by the generating to the image-capturing unit for capturing the captured image, via a network.

11. An image processing method comprising:

acquiring information for identifying a position of a vertex of a plane in a captured image, the captured image including a structure composed of a plurality of planes as an object;

identifying points corresponding to positions of vertexes of the plane on a spherical coordinate that corresponds to an image-capturing range of an image-capturing unit that captures the captured image based on the information acquired by the acquiring, correcting positions of the points on the spherical coordinate to form a three-dimensional shape having the points on the spherical coordinate as the vertexes, into a predetermined three-dimensional shape; and generating an overhead image by making a region in the captured image corresponding to the positions of the points corrected by the correcting, as a region corresponding to the plane.

12. A non-transitory computer readable storage medium storing a program that, when executed, causes a computer to perform a process comprising:

acquiring information for identifying a position of a vertex of a plane in a captured image, the captured image including a structure composed of a plurality of planes as an object;

identifying points corresponding to positions of vertexes of the plane on a spherical coordinate that corresponds to an image-capturing range of an image-capturing unit that captures the captured image based on the information acquired by the acquiring, correcting positions of the points on the spherical coordinate to form a three-dimensional shape having the points on the spherical coordinate as the vertexes, into a predetermined three-dimensional shape; and generating an overhead image by making a region in the captured image corresponding to the positions of the points corrected by the correcting, as a region corresponding to the plane.

* * * * *